United States Patent [19]

Caenazzo et al.

[11] Patent Number: 4,981,006
[45] Date of Patent: Jan. 1, 1991

[54] DEVICE FOR SEALING THE OVERLAPPED END FLAPS OF A THERMOPLASTIC MATERIAL WRAPPER FOR PACKAGES, PARTICULARLY FOR PACKAGES OF CIGARETTES

[75] Inventors: Santo Caenazzo, Rho; Sandro Corticelli, Castello d'Argile, both of Italy

[73] Assignee: SASIB S. p. A., Bologna, Italy

[21] Appl. No.: 368,649

[22] Filed: Jun. 20, 1989

[30] Foreign Application Priority Data

Jul. 20, 1988 [IT] Italy .................. 12525 A/88

[51] Int. Cl.⁵ ............................................. B65B 51/18
[52] U.S. Cl. ...................... 53/388; 156/583.5; 219/243
[58] Field of Search ............. 53/148, 375, 379, 387, 53/388; 156/555, 583.1, 583.5; 219/243

[56] References Cited

U.S. PATENT DOCUMENTS

| | | | |
|---|---|---|---|
| 3,057,125 | 10/1962 | Jensen et al. | 53/388 |
| 3,083,514 | 4/1963 | Smith et al. | 53/388 |
| 3,140,971 | 7/1964 | Crescenzo et al. | 53/388 |
| 3,190,056 | 6/1965 | Ramaika et al. | 53/388 |
| 3,353,332 | 11/1967 | Bartlo et al. | 53/388 |
| 3,899,863 | 8/1975 | Seragnoli et al. | 53/388 X |
| 4,220,847 | 9/1980 | Focke et al. | 53/388 X |
| 4,771,683 | 9/1988 | Schermutzki | 156/583.1 X |

Primary Examiner—Robert L. Spruill
Assistant Examiner—Linda B. Johnson
Attorney, Agent, or Firm—Larson and Taylor

[57] ABSTRACT

The invention relates to a device for sealing the folded over and overlapped end flaps (L1, L2) of the plastics material wrapper for packages (P), particularly for packages of cigarettes. In this device, the packages (P) to be sealed are passed after each other between the heated sealer bodies (7) of at least a stationary pair of opposite sealer bodies (7—7) the active faces of which engage, in their operative position, the respective ends of the packages (P) with the intermediary of the parallel facing stretches (102) of two endless belts running in the same direction and at the same speed as the packages. According to the invention, the active surface of each sealer body (7) of at least one pair of opposite sealer bodies (7—7) comprises at least two slightly protruding i.e. in-relief zones (8,9; 18,19,20; 108,208,308,109,209,309; 118,119,120,218,219,220) staggered from each other both in the direction (F) of movement of the packages (P) and transversely to said direction. In the operative position of two opposite sealer bodies (7,7), the distances between the surfaces of the slightly protruding zones of the two sealer bodies is such that the higher specific pressure exerted at said slightly protruding zones will not damage the packages (P) and their contents.

12 Claims, 3 Drawing Sheets

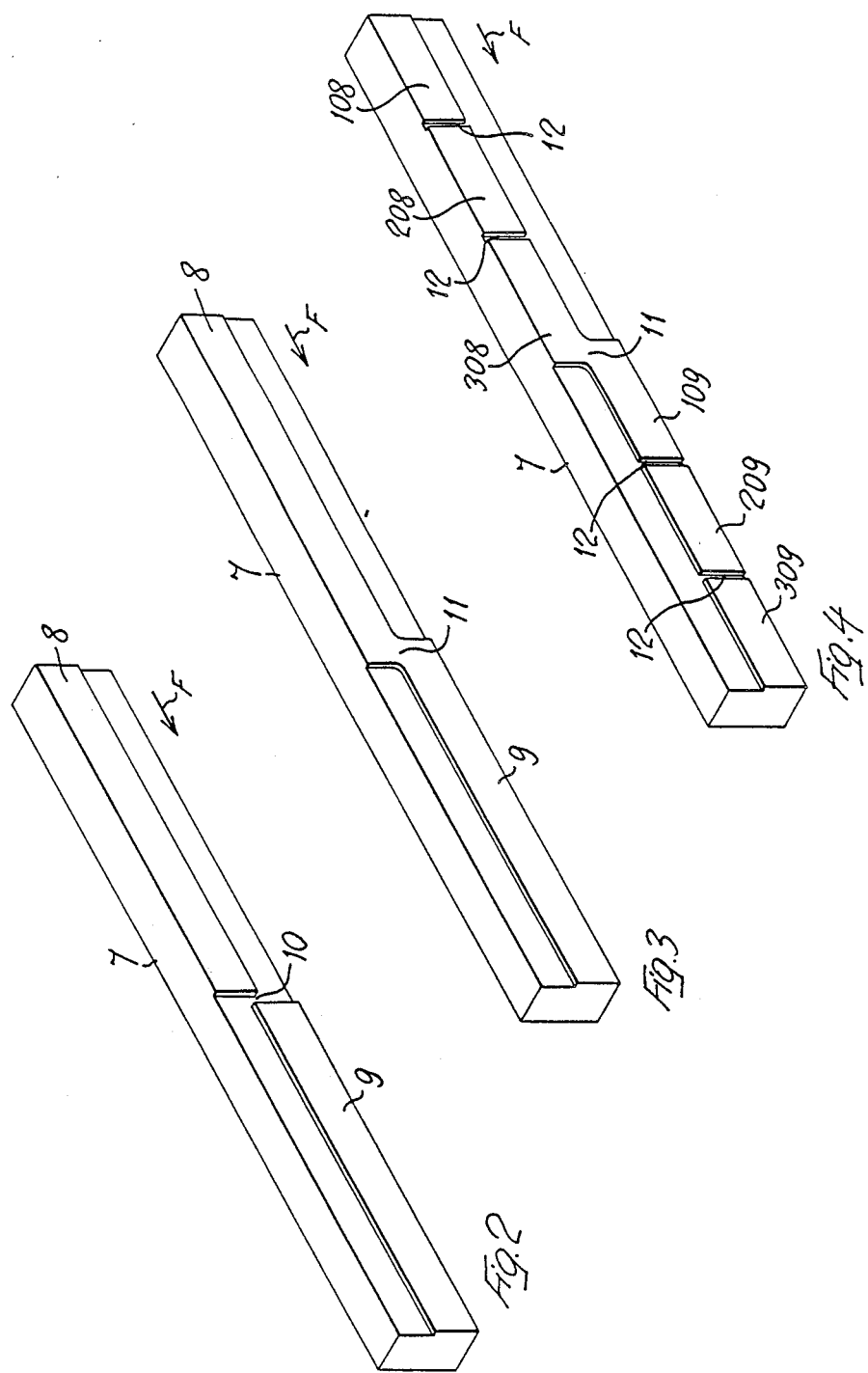

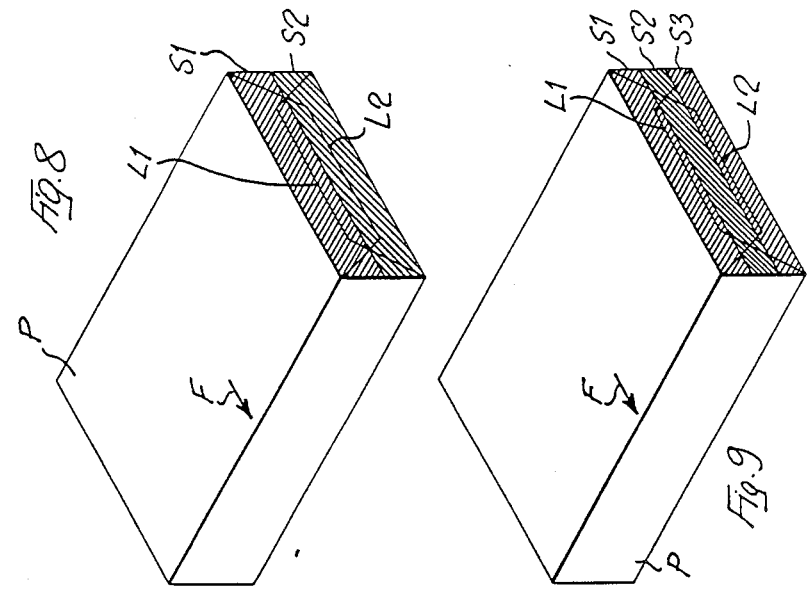
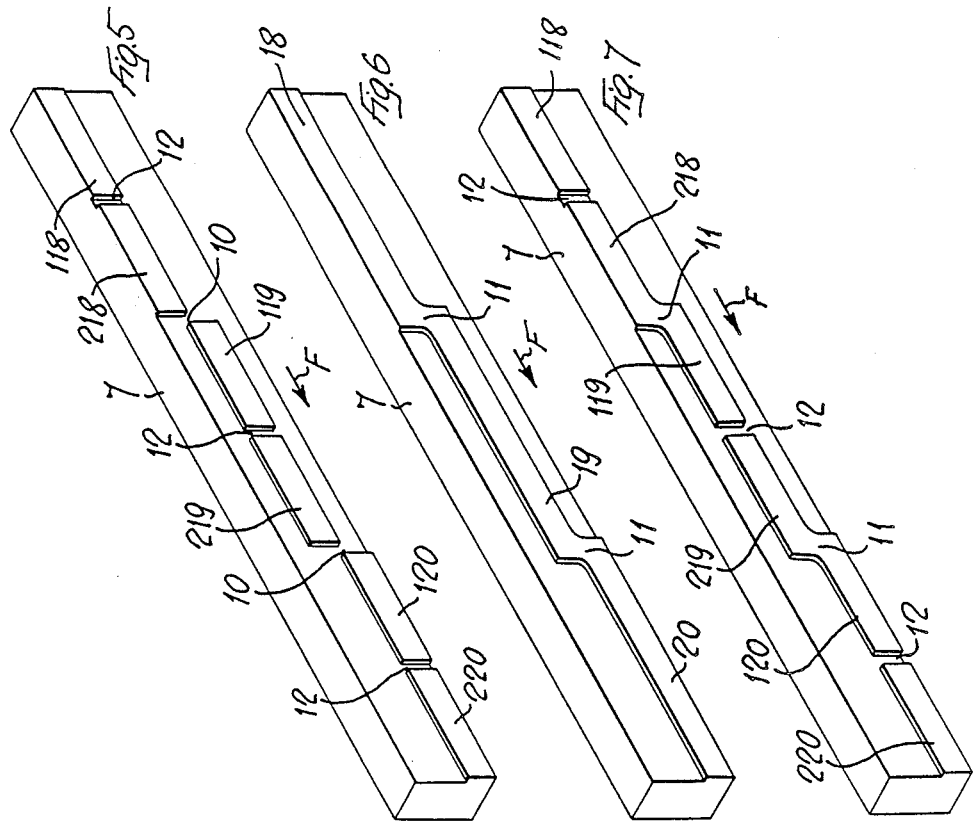

DEVICE FOR SEALING THE OVERLAPPED END FLAPS OF A THERMOPLASTIC MATERIAL WRAPPER FOR PACKAGES, PARTICULARLY FOR PACKAGES OF CIGARETTES

SUMMARY OF THE INVENTION

The invention relates to the devices for sealing the folded over and overlapped end flaps of the plastics material wrapper for packages, more particularly packages of cigarettes; in said devices, the packages to be sealed are passed after each other between the heated sealer bodies of at least one stationary pair of opposite sealer bodies the active faces of which engage, in their operative position, the respective ends of the packages with the intermediary of the parallel facing stretches of two endless belts running in the same direction and at the same speed as the packages.

Sealing by said devices is effected mainly by three factors: temperature, time and pressure. For each type of material of the wrapper to be sealed there will be an optimum value of the sealing temperature, which may be obtained and maintained within the required tolerance limits with no particular difficulty by means of conventional thermostatic control devices. The sealing time depends upon the extent of the sealer bodies in the direction of the movement of the packages. Moreover, the optimum value of the sealing time may be maintained substantially constant, regardless of the speed, for example, by providing two successive stationary pairs of opposite sealer bodies and by selectively moving to the operative position (i.e. with the active surfaces contacting against the respective belts) the sealer bodies of only one pair of sealers in case of reduced speed of the machine, or the sealer bodies of both pairs of sealers in case of normal operative speed of the machine. In case of stoppage of the machine, the sealer bodies of both pairs of sealers are moved away from the respective belts.

The sealing pressure entails the greatest difficulties of regulation, especially in case of packages containing cigarettes or any other articles or products liable to be distorted. In the known devices of the type described in the preamble, the active surfaces of the sealer bodies are planar, continuous and extending transversely to the direction of movement of the packages, over the respective entire height (or width) of the surface to be sealed.

The specific sealing pressure exerted against the ends of the packages is, necessarily, a compromise between a pressure that causes no damage to the contents of the packages and a pressure required to ensure a suitable sealing of the flaps of the thermoplastic wrapper, which are folded over and overlapped at the ends of the package.

However, the end surfaces of the packages, whereon the sealings are to be effected, are not perfectly parallel and/or planar exhibit irregularities due to the particular configuration of the folded over and overlapped flaps of the thermoplastic wrapper for the package. More particularly, in case of packages of cigarettes, the end surfaces of the packages have a substantially convex shape. Moreover, the packages being passed between the sealer bodies with the intermediary of the respective stretches of the two endless belts, may assume, for example, on the respective sliding guides, oblique positions wherein the end surfaces of the packages are not parallel to the active surfaces of said sealer bodies.

Due to said irregularities, in the conventional sealing devices of the type specified above, the contact between the surfaces emitting the sealing heat and the surfaces receiving said heat is often discontinuous and, therefore, the sealing pressure is distributed not uniformly on said surface to be sealed.

The invention aims to overcome said disadvantages and to obtain such pressure conditions between the sealer bodies and the end faces of the packages (with the intermediary of said belts), as to ensure a uniform and satisfactory sealing of the respective folded over and overlapped flaps of the thermoplastic wrapper, without damaging the articles or products contained within the packages and regardless of the inevitable irregularities of parallelism and/or planarity of the end faces of the packages to each other and to the active surfaces of the sealer bodies, all the above in a simple and economic manner and with no substantial constructional modification of the entire device, and especially by maintaining the two interposed belts between the sealer bodies and the packages.

This problem is solved by the invention in that the active surface of each sealer body of at least a pair of opposite sealer bodies is formed with at least two slightly protruding i.e. in-relief zones which are staggered to each other in the direction of the movement of the packages and transversely to said direction, while in the operative position of the two opposite sealer bodies the distance between the surfaces of the protruding zones of these two sealer bodies is such that the greater specific pressure exerted at said protruding zones will not damage the packages and their contents.

In a preferred embodiment of the invention, each sealer body of at least one pair of opposite sealer bodies is provided, on its active surface, with a pattern in slight relief, which extends over at least two longitudinal imaginary strips of the surface to be sealed on the respective end face of the package, said strips being side by side and being parallel to the direction of movement of the packages, while on the active surface of each sealer body in registry with each of said longitudinal imaginary strips there is provided at least one slightly protruding zone extending on a fraction of the length of the sealer body in the direction of the movement of the packages and offset in the direction of the movement of the packages with respect to the protruding zone or zones associated with the other imaginary longitudinal strip or strips.

In the device according to the invention, upon the passage of the packages between two opposite sealer bodies, the sealing of the folded over and overlapped flaps of the thermoplastic wrapper on the end faces of the packages is not effected simultaneously over the entire dimension of the surface to be sealed transversely to the direction of movement of the packages, as in the devices known heretofore, but the flaps of the thermoplastic wrapper, folded over and overlapped on the end faces of a package, are sealed first at a longitudinal imaginary strip of the surface to be sealed and then, at least, at a further longitudinal imaginary strip of said surface to be sealed, by the action of the respective protruding zones of the active surfaces of the sealer bodies. The greater specific pressure exerted by each protruding zone eliminates the superficial irregularities of planarity and/or parallelism of the respective end face of the package and ensures a more uniform contact between the surfaces emitting heat and the surfaces receiving said heat, so as to obtain a corresponding more uniform sealing pressure and, therefore, a more uniform sealing of the folded over and overlapped flaps of the thermoplastic wrapper. The higher specific pressure exerted against the end faces of the package at the protruding zones will not cause any damage to the package and its contents, because in the operative position of the two opposite sealer bodies, the distance between the surfaces of the facing zones is such that said zones can cause, by virtue of the higher specific pressure exerted by them, only shallow deformations which are necessary to eliminate the superficial irregularities and to ensure a uniform sealing pressure, but not major distortions that could damage the package and its contents. As a consequence, while obtaining a greater uniformity of the sealing pressure at partial protruding zones which exert a higher specific pressure, the package is subjected as a whole to a pressure which is smaller than that of the heretofore known devices of the type described in the preamble, whereby the invention ensures, in addition, a more delicate treatment of the packages upon sealing the thermoplastic wrapper.

An even more delicate treatment of the package and a greater reliability against distortions and damages thereto may be obtained according to the invention by making the sealer bodies resiliently yieldable outwards.

It is also to be noted that while the sealing pressure is concentrated and intensified at the protruding zones of the active surface of said sealer bodies, the sealing heat is emitted actually from all the active surface of the sealer bodies due to the slight relief of the protruding zones from said active surface. As a consequence, the length of the sealer bodies in the direction of the movement of the packages may be limited and particularly it may have similar dimensions as the heretofore known sealer bodies.

BRIEF DESCRIPTION OF THE DRAWINGS

These and further characteristics of the invention and the advantages resulting therefrom will be apparent with more details in the following description of some preferred embodiments thereof, shown by way of non-limiting examples in the accompanying drawings, wherein:

FIGS. 2 to 7 are perspective views of various embodiments of the active surface of a sealer body of the device according to FIG. 1;

FIGS. 8 and 9 are diagrammatic perspective views of the sealing strips on the end face of a package.

DESCRIPTION OF THE PREFERRED EMBODIMENTS

Figure 1:
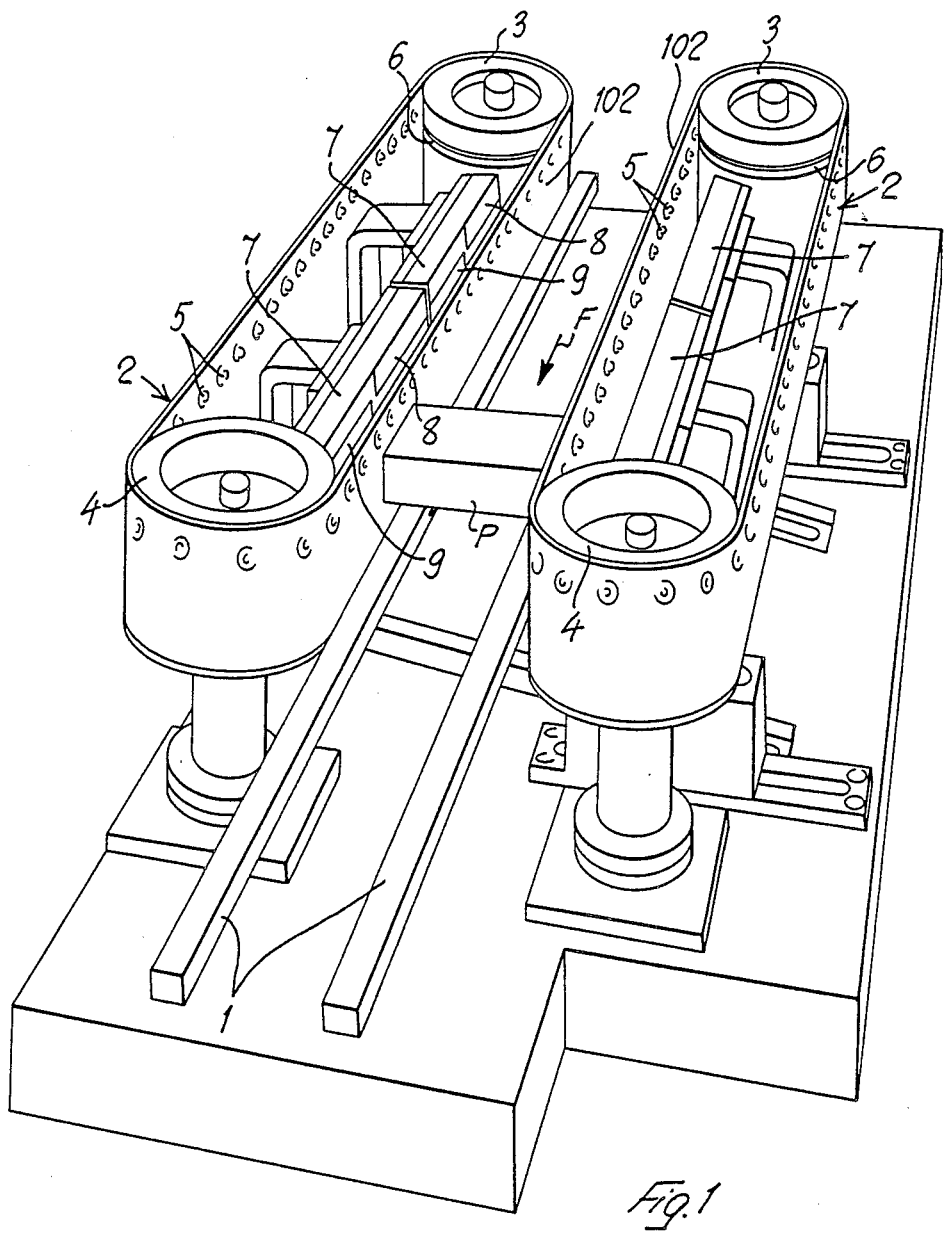
FIG. 1 is a diagrammatic perspective view of a device for sealing the overlapped end flaps of the thermoplastic wrapper for packages, particularly for cigarette packages.

The device shown in FIG. 1 is known per se and comprises substantially horizontal guides 1 whereon the packages P provided each with a wrapper of thermoplastic material, for example cellophane, are slidably moved, for example, in the direction of the arrow F. The flaps L1, L2 (FIGS. 8 and 9) of said wrapper are folded over and overlapped on each other on the two end faces of the respective package P and are to be sealed to each other when the package P is passed through the device along the guides 1. At both sides of said guides 1 there are provided endless belts 2, for example, made of teflon, or the like, and each stretched between two turn-round, vertical-axis pulleys 3 and 4. One of the two pulleys 3, 4 for each belt 2 is rotated so as to move said belts 2 in such a direction whereby the two inner vertical stretches 102, which are parallel and opposite to each other, of the two belts 2 will move in the same direction F as the cigarette packages P and at the same speed as said packages. The belts 2 may be provided with guide projections 5, which are mutually aligned and spaced, and which become engaged into corresponding peripheral grooves 6 in the turn-round pulleys to prevent the prevent the belts 2 from shifting.

The packaging P, only one of which is shown for simplicity in FIG. 1, rest on the guides 1, laid down on either larger face thereof and are disposed trasversely to their direction of advance F, whereby their end faces are directed towards the two belts 2. The distance between the facing stretches 102 of the two belts 2 is such that the end faces of the packages P are engaged with said stretches 102 of the belts 2.

The advance of the packages P on the guides 1 in the direction of the arrow F may be caused by dragging the packages P by means of the stretches 102 of the belts 2 or by means of a suitable chain-conveyor provided with pushers (not shown). In the latter instance, the speed of conveyance and advance of the packages P must be the same as the speed of movement of the belts 2, so as to avoid any rubbing or relative movement between the packages P and the stretches 102 of the belts 2, which are engaged by said packages P.

Disposed along the guides 1 are two successive pairs 7—7 of opposite sealer bodies 7. The sealer bodies 7 of each pair 7—7 are suitably heated and are disposed on the outer sides of the stretches 102 of the two belts 2, i.e. on the opposite sides with respect to the guides 1 and the packages P. In order to seal the flaps L1, L2 of the thermoplastic wrapper, which are folded over and overlapped on the end faces of the package P, the sealer bodies 7 are moved to an operative position wherein their active surfaces facing towards the packages P engage the respective stretches 102 of the belts 2 and therefore, with the intermediary of said belts, they engage the end faces of the packages P that are moved on the guides 1. At the rated speed of the machine and packages P, the sealer bodies 7 of both pairs of sealers 7—7 are in their operative position, i.e. they engage the stretches 102 of the belts 2. At the reduced speed of the machine and packages P, only the sealer bodies 7 of one of the pairs of sealers 7—7 are moved to, and maintained in, the operative position against the stretches 102 of the respective belts 2.

When the machine and the flow of packages P on the guides 1 are stopped, the sealer bodies 7 of both pairs of sealers 7—7 are moved away from the stretches 102 of the respective belts 2.

The active surface of each sealer body 7, i.e. the surface thereof facing towards the stretch 102 of the respective belt 2 and acting with the intermediary of said belt, against the respective end face of the packages P, extends in the direction of the height, i.e. transversely to the direction F of advance of the packages P, over the entire corresponding height of the surface to be sealed on the respective end face of the package P, for example over the entire height of said end face. In the embodiment shown in FIG. 2, said active surface of the sealer body 7 comprises two slightly protruding partial zones 8 and 9 extending in the direction F of movement of the packages P. The surface to be sealed or each end face of the package P is divided into two longitudinal imaginary strips S1 and S2 superposed on each other and extending in the direction F of movement of the packages P. Said two longitudinal imaginary strips S1, S2 are indicated with different hatchings in FIG. 8. The protruding partial zone 8 of the active surface of the sealer body 7 is disposed in registry with the upper longitudinal imaginary strip S1 of the surface to be sealed, while the protruding partial zone 9 of the active surface of the sealer body 7 is disposed in registry with the lower longitudinal imaginary strip S2 of the surface to be sealed. The two protruding zones 8 and 9, therefore, are staggered to each other in the direction of the height, and are also staggered longitudinally, i.e. in the direction F of movement of the packages P.

In the embodiment of FIG. 2, the two protruding zones 8, 9 of the sealer body 7 are separated from each other by a transverse notch 10. Moreover, preferably, the width, i.e. the height of each protruding zone 8, 9 is slightly greater than the width, i.e. the height of the corresponding longitudinal imaginary strip S1, S2 of the surface to be sealed at the end face of a package P, and each protruding zone 8, 9 disposed in registry with one of said longitudinal imaginary strips S1, S2 slightly over-extends into the adjacent imaginary strip.

FIG. 3 shows a modification of the embodiment of FIG. 2. In this case, the two protruding zones 8, 9, rather than separated from each other by a transverse notch 10, are connected to each other by a jointing protruding zone 11. The milling operations at the depressed zones of the active surface of the sealer body 7 are thus simplified.

FIG. 4 shows a further modification which may be applied to either the embodiment of FIG. 3 (as shown) and the embodiment of FIG. 2. As apparent from FIG. 4, in this instance, at each longitudinal imaginary strip S1, S2 of the surface to be sealed at the end face of the package P, on the active surface of the sealer body 7 there is provided a row of three protruding zones 108, 208, 308 and 109, 209, 309 separated from each other by transverse notches 12. The two adjacent zones 308 and 109 of the rows of protruding zones associated with the two longitudinal imaginary strips S1, S2 are connected to each other by a jointing protruding zone 11, but they may also be separated by a transverse notch 10. Also the two rows of protruding zones 108, 208, 308 and 109, 209, 309 are, preferably, of such a height as to comprise each a short fraction of the height of the other longitudinal imaginary strip S2 or S1.

By means of the sealer bodies 7 constructed according to the FIGS. 2 to 4, the flaps L1, L2 of the thermoplastic wrapper, folded over and overlapped on the end faces of the package P are sealed—upon the passage of the package P in the direction of the arrow F between two sealer bodies 7—first at the longitudinal imaginary strip S1 by the action of the pressure exerted by the respective protruding zone 8 or row of protruding zones 108, 208, 308 and then at the other longitudinal imaginary strip S2 by the action of the pressure exerted by the respective protruding zone 9 or the row of protruding zones 109, 209, 309. The sealed areas produced by the two protruding zones 8 and 9 or the two rows of protruding zones 108, 208, 308 and 109, 209, 309 are slightly overlapped on each other as a result of said height of these protruding zones. The specific sealing pressure exerted by each protruding zone 8, 9 or each row of protruding zones 108, 208, 308 and 109, 209, 309 is twice the specific sealing pressure which would be exerted by each sealer body 7 in the absence of said protruding zones, i.e. if the entire active surface were completely planar. This higher specific sealing pressure eliminates all the planarity and parallelism irregularities of the end faces of the packages P and thus ensures a uniform sealing pressure and, therefore, a very uniform sealing of the flaps of the thermoplastic wrapper, with no damage to the packages P or their contents, since in the operative position of the two opposite sealer bodies 7 the distance between the facing surfaces of their protruding zones 8, 9, 108, 208, 308, 109, 209, 309 is such as to limit the action of the specific pressure exerted by these zones only to eliminate said irregularities of the end faces of the packages P.

The embodiments of the sealer bodies 7 shown in the FIGS. 5 to 7 are referred to constructions wherein the surface to be sealed or each end face of a package P are divided into three longitudinal imaginary strips S1, S2, S3 shown with different hatchings in FIG. 9. Also these longitudinal imaginary strips S1, S2, S3 are overlapped on each other and extend in the direction F of the movement of the packages P. In registry with each of these longitudinal imaginary strips S1, S2, S3 the active surface of each sealer body 7 has a protruding zone 18, 19, 20 (FIG. 6) or a row of at least two protruding zones 118, 218; 119, 219 and 120, 220 which are separated from each other by transverse notches 12 (FIGS. 5 and 7). The protruding zones 18, 19, 20 and the rows of protruding zones 118, 218; 119, 219 and 120, 220 are staggered to each other in the longitudinal direction of the sealer body 7, i.e. in the direction F of movement of the packages P. In the embodiment of FIG. 5, the rows of protruding zones 118, 218; 119, 219 and 120, 220, associated with different longitudinal imaginary strips S1, S2, S3, are separated from each other by transverse notches 10, while in the embodiment of FIG. 7 the adjacent protruding zones 218, 119 and 219, 120 of the rows of protruding zones associated with the three longitudinal imaginary strips S1, S2, S3 are connected to each other by protruding jointing zones 11.

In the embodiment of FIG. 6, the three protruding zones 18, 19 and 20 associated with the three longitudinal imaginary strips S1, S2, S3 are connected to each other by protruding jointing zones 11, but they may also be separated from each other by transverse notches 10 like the embodiment of FIG. 2.

The operation of the sealer bodies 7 of the FIGS. 5 to 7 corresponds substantially to that of the sealer bodies 7 of the FIGS. 2 to 4, with the exception that in the instance of the FIGS. 5 to 7 the sealing of the flaps L1, L2 of the thermoplastic wrapper, folded over and overlapped on the end faces of the package P, is effected in three successive steps, corresponding to the three longitudinal imaginary strips S1, S2, S3, while each protruding zone 18, 19, 20, and each row of protruding zones 118, 218; 119, 219; 120, 220 exert a specific sealing pressure which is three times the specific sealing pressure which would be exerted by the planar active surface of each sealer body in the absence of said protruding zones.

Also in the embodiments of FIGS. 5 to 7, the protruding zones 18, 19, 20 and the three rows of protruding zones 118, 218; 119, 219; 120, 220 are preferably of such a height as to produce a partial overlapping of the respective sealings effected at the three longitudinal imaginary strips S1, S2, S3.

The protruding zones 8, 9, 108, 208, 308, 109, 209, 309, 18, 19, 20, 118, 210, 119, 219, 120, 220 of the rows may have any length in the direction F of movement of the packages P. Preferably, however, the protruding zones 108, 208, 308, 109, 209, 309, 118, 218, 119, 219, 120, 220 of the rows of protruding zones in the embodiments of FIGS. 4, 5 and 7 have each in the direction F of movement of the packages P a length which is smaller than the corresponding dimension of the end faces of the package P, so as to avoid that their side corners act as bridges and hinder the uniform engagement of said protruding zones, with the intermediary of the belt 2, against the end faces of the packages P.

Also the protrusion of the protruding zones from the active surface of the sealer bodies 7 may have any value which is best suited to the type of package, the contents thereof and the material of the thermoplastic wrapper. In the particular case of cigarette packages and cellophane wrappers, the protrusion of the protruding zones from the active surface of the respective sealer body 7 may be of the order of 0.2–0.6 mm.

We claim:

1. A device for sealing folded over and overlapped end flaps of a plastic material wrapper for packages, said device comprising means for moving the packages in serial relationship along a predetermined path, first and second endless belts disposed on opposite sides of said path, such that parallel stretches of said endless belts extend along opposite sides of said path, means for moving said endless belts in the same direction as, and at the same speed as, the packages, at least one pair of opposed sealer members located on opposite sides of said path and movable to an operative position wherein an active surface of each sealer member provides engagement between a respective end face of a said package and a corresponding intermediate portion of respective ones of said parallel stretches of said first and second endless belts, said active surfaces of said at least one pair of sealer members each comprising at least two slightly protruding zones staggered with respect to each other both in the direction of movement of said packages along said path and transversely to said direction of movement, and the spacing between the protruding zones of said sealer members, when said sealer members are in said operative position, being such that pressure exerted at said protruding zones will not damage the packages and the contents thereof.

2. A device according to claim 1 wherein each sealer member of said at least one pair of opposed sealer members includes, on the active surface thereof, a slight relief extending along at least two imaginary strips of the surface to be sealed on the respective end faces of the package, said strips being disposed in side-by-side relationship parallel to the direction of movement of the packages, and said relief comprising, in registration with each of said longitudinal imaginary strips, at least one slightly protruding zone extending over a fraction of the length of the corresponding sealer member in the direction of the movement of the packages and staggered in the direction of movement of the package with respect to a protruding zone associated with another longitudinal imaginary strip.

3. A device according to claim 2 wherein only a single continuous protruding zone is provided on the active surface of the sealer member in registration with each longitudinal imaginary strip.

4. A device according to claim 2 wherein a row of at least two protruding zones separated from each other is provided on the active surface of the sealer member in registration with each longitudinal imaginary strip.

5. A device according to claim 4 wherein the individual protruding zones of each row of protruding zones are of an extent, in the direction of movement of the packages, which is smaller than the extent of the end faces of the packages.

6. A device according to claim 3 wherein protruding zones associated with different longitudinal imaginary strips are separated from one another.

7. A device according to claim 4 wherein said rows of protruding zones associated with different longitudinal imaginary strips are separated from each other.

8. A device according to claim 3 wherein protruding zones associated with different longitudinal imaginary strips are connected to each other by protruding joining zones.

9. A device according to claim 4 wherein the rows of said protruding zones associated with different longitudinal strips are connected to each other by protruding joining zones.

10. A device according to claim 3 wherein a protruding zone associated with one longitudinal imaginary strip extends transversely to said strip to a small extent so as to overlap an adjacent longitudinal imaginary strip.

11. A device according to claim 4 wherein a row of protruding zones associated with one longitudinal imaginary strip extends transversely to said strip to a small extent so as to overlap an adjacent longitudinal imaginary strip.

12. A device according to claim 1 wherein said sealer members are resiliently yieldable transversely to the direction of movement of the packages.

* * * * *